UNITED STATES PATENT OFFICE.

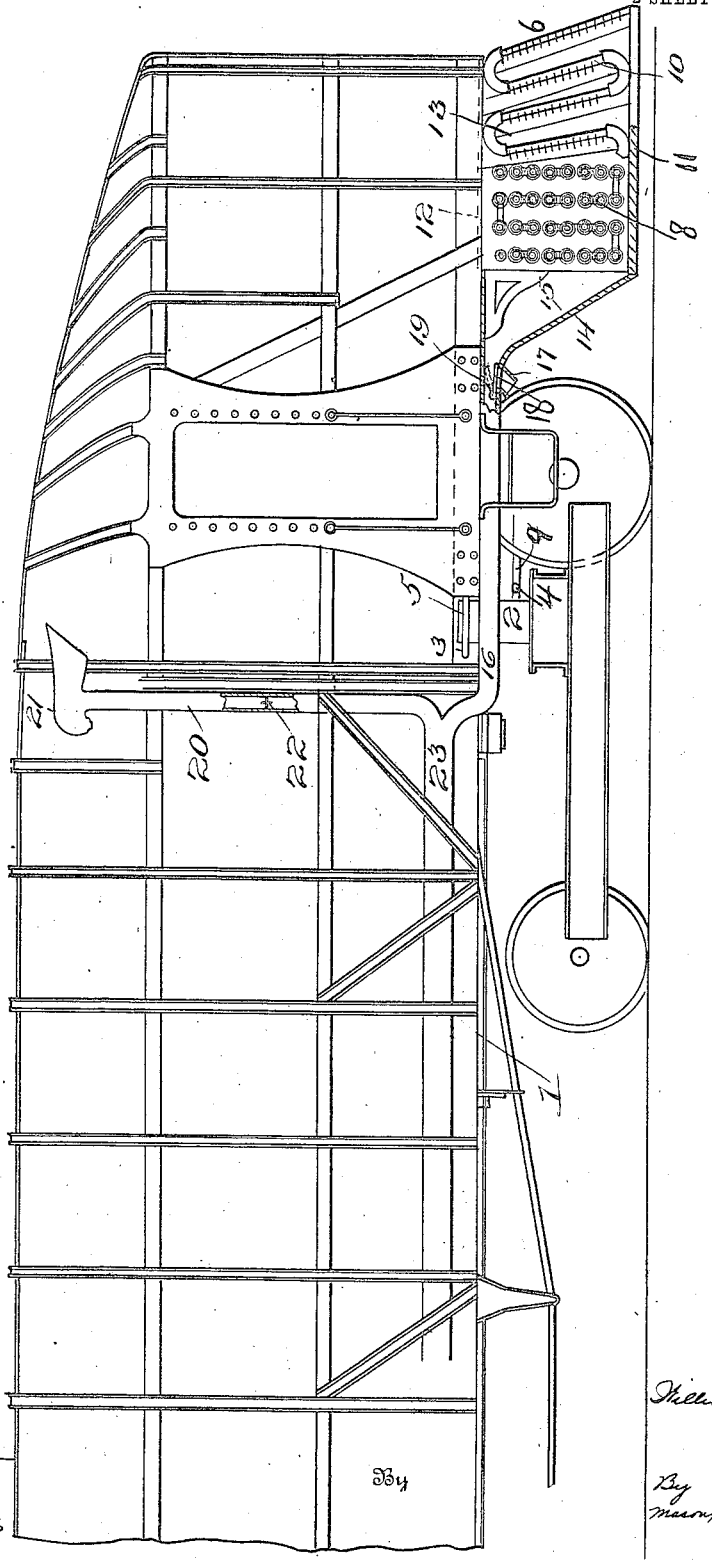

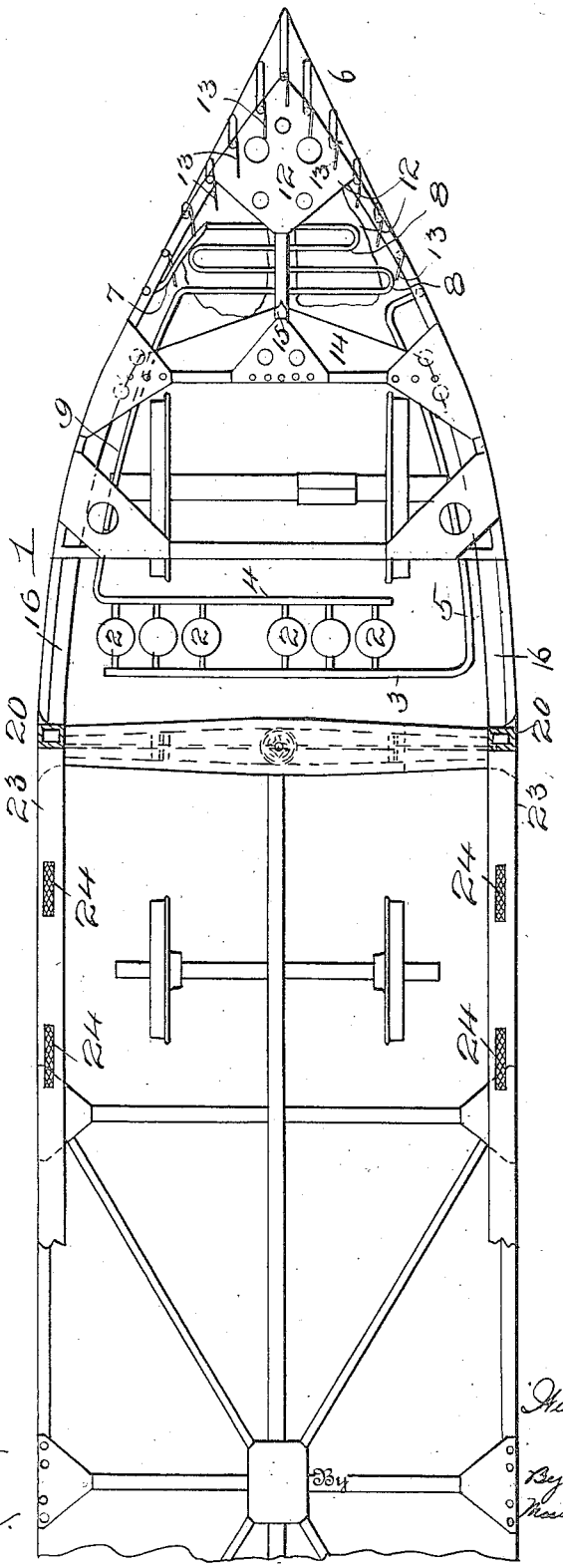

WILLIAM R. McKEEN, JR., OF OMAHA, NEBRASKA.

HEATING AND VENTILATING SYSTEM.

No. 817,658.   Specification of Letters Patent.   Patented April 10, 1906.

Application filed June 1, 1905. Serial No. 263,315.

*To all whom it may concern:*

Be it known that I, WILLIAM R. McKEEN, Jr., a citizen of the United States, residing at Omaha, in the county of Douglas and State of Nebraska, have invented certain new and useful Improvements in Heating and Ventilating Systems; and I do hereby declare the following to be a full, clear, and exact description of the invention, such as will enable others skilled in the art to which it appertains to make and use the same.

This invention relates to heating and ventilating systems, and is particularly directed to the provision of apparatus designed to supply either hot or cold air to the interior of a car or other vehicle.

One of its objects is to provide means whereby the air to be supplied for heating and ventilation is heated by means of the mechanism employed for propelling such vehicle.

Another object is to provide means connected with a water-jacket of an internal-combustion engine such that the water employed to cool the operative parts thereof may be utilized for heating air to be conducted into the interior of a car.

Other objects will be in part obvious and in part pointed out hereinafter.

The invention accordingly consists in the features of construction, combinations of elements, and arrangement of parts, which will be exemplified in the apparatus hereinafter described, and the scope of the application of which will be indicated in the following claims.

In the accompanying drawings, wherein is illustrated one of the various possible embodiments of my invention, Figure 1 is a view in side elevation of the framework of a motor-propelled car, showing the same embodied therein. Fig. 2 is a top plan view of the same, showing the floor-framework of the car, some of the parts being broken away.

Similar reference characters refer to similar parts throughout both figures of the drawings.

Preliminary to a description of the specific features of my invention and as conducive to a clearer understanding of certain of the objects thereof, it may here be noted that in motor-propelled cars wherein engines of the internal-combustion type are employed to furnish the motive power therefor it is necessary to provide means to cool certain operative parts of the engine. I have therefore found it desirable to provide a heating and ventilating system such that the heat generated by the engine is not dissipated, but is utilized to accomplish highly beneficial results in heating and ventilating the car, the system being so constructed and arranged as to furnish at will either hot or cold air to the interior of the car and to regulate the quantities thereof so furnished.

In order to secure these among other results, I employ a structure involving the features disclosed in the accompanying drawings, in which 1 indicates the framework of the car, which, as far as the present invention is concerned, may be of any preferred type.

It may here be noted that the type of car herein illustrated embraces novel features of construction, to which features no claim is made in this case, the same being shown, described, and claimed in my copending application, Serial No. 260,524, filed May 15, 1905.

Suitably mounted in the framework or upon one of the trucks carrying the same are any well-known type of internal-explosion engines 2 2, which engines are provided with the usual water-jackets for maintaining the engines at the required low temperature. All of said water-jackets are connected by a suitable pipe 3, arranged at the upper ends of said water-jackets, and all of the water-jackets are connected at their lower ends by a similar pipe 4. A pipe 5 communicates with the pipe 3 and extends forwardly to and communicates with a tubular pilot 6.

The pilot 6 is made up of a bent tube producing a fender adapted to serve the purpose of the ordinary pilot of a locomotive. The pilot-tube sections are arranged substantially vertically and are given, preferably, a slight inclination, and at the end of the continuous tube constituting the pilot said tube communicates by a pipe 7 with transversely-positioned coils 8 8, and the last of said coils communicates with the pipe 9, leading to the pipe 4. Thus in operation the water in the jackets of the engines 2, rising under the action of the heat, passes out through the pipe 3, pipe 5, and pilot 6 to the coils 8, and thence back through the pipe 9 and pipe 4 to the lower end of the jacket in a cooled condition. A pump (not herein shown) may be interposed in the system for accelerating the circulation, if desired, and the ordinary radiating-flanges, such as are seen at 10, may be arranged on the several tubes of the circulating system for aiding in the dissipation of the heat in the system. I preferably apply only one-half of the usual radiating-flange to the tubes constituting the pilot 6, the exposed one-half of the tubes being left without the flanges in order that the tubes may serve more effectually as a pilot without danger of their being damaged by contact with a foreign object. Thus it is to be observed that a car provided with the system above described moving forward subjects such cooling system to the fresh air through which the car is passing, and therefore effects a perfect cooling of the system. The air passing through the pilot and the coils in the rear of the pilot absorbs the heat from the system, and therefore itself becomes heated, and in order to heat the interior of the car when desired I propose to provide means for directing such heated air into the interior of the car or for disposing of such heated air outside the car when it is not desired to heat the car. The pilot serves as a preliminary heater to temper the air, which is thereupon deflected by the baffle-plates 13 and the current thereof concentrated and thrown into the closely-disposed members of the coil 8. The latter serves to bring the tempered air to a yet higher degree of temperature and transmit the same toward the car, as hereinafter described. To attain this result, a closed base 11 is provided for the pilot 6, and a cover 12 is formed therefor, and each of the tubes of the pilot at each side of the car is provided with a shield or baffle-plate 13, directing the air inwardly into contact with a hood 14, arranged transversely of the car and extending for the width thereof, said hood being provided with a divide or vertical web 15, arranged centrally of the car, and the hood is positioned with its walls inclined rearwardly from such divide, so that approximately one-half of the heated air passing through the pilot and coils into the hood is directed to each side of the car, and at each side of the car is arranged an air-conduit 16, each of said conduits being provided with a discharge 17, normally closed by valve 18, each valve 18 being provided with a stem 19, connected with the pintle of the valve and designed to be operated for swinging the valve from the position indicated in full lines in Fig. 1 to the position indicated in dotted lines therein or for swinging the valve from the position indicated in dotted lines to the position indicated in full lines, it being observed that when the valve is in the position indicated in full lines the heated air will be directed throughout the length of the conduit 16, while when the valve is in the position indicated in dotted lines the heated air will be discharged out discharge-opening 17.

At each side of the car is an air-flume 20, at the upper end of each of which is arranged a suitable ventilator-hood 21, adapted to direct air down said flume, and a valve 22 is arranged in the flume and adapted to control the amount of air admitted through the flume. The cool-air flume 20 and the heated-air conduit 16 unite within the car at the point 23 and extend rearwardly in the form of an enlarged duct at the side of the car, suitable registers being arranged, as at 24 24, along the length of each of said enlarged ducts.

Having described my invention, together with its method of use, it will accordingly be seen that I have provided a ventilating system characterized by increased simplicity and efficiency. The heated coils perform the double function of furnishing a cooling means for the propelling mechanism of the car and heating the air employed in the ventilation thereof. The provision of the conduits, one of which leads from the coils and the other leading from without the roof of the structure, and the regulating-valves insures a proper mixture of hot and cold air and provides for the conduction of either into the interior of the car in the desired amount.

As many changes could be made in the above construction and many apparently widely different embodiments of my invention could be made without departing from the scope thereof, I intend that all matter contained in the above description or shown in the accompanying drawings shall be interpreted as illustrative and not in a limiting sense. I desire it also to be understood that the language used in the following claims is intended to cover all of the generic and specific features of the invention, herein described and all statements of the scope of the invention, which as a matter of language might be said to fall therebetween.

What I claim is—

1. In a heating system, in combination with a car, a tubular pilot thereon adapted to prevent obstructions from passing beneath said car, means for propelling said car adapted to heat said tubular pilot and means for conducting air contacting with said pilot to the interior of the car.

2. In a heating system, the combination with a car of a tubular pilot adapted to prevent obstructions from passing thereunder, means for propelling the car, a coil connected with said tubular pilot and interposed between the same and said propelling means, connections between said propelling means and said coil and pilot whereby the latter are heated by the former and means for directing air contacting with said tubular pilot and said coil to the interior of the car.

3. In a heating system, the combination with a car of a pilot, an internal-explosion engine adapted to propel the car, a water-jacket about said engine, connections between said water-jacket and said pilot, said pilot being adapted to prevent obstructions from passing under said car and circulate water from said jacket and means for directing air contacting with said pilot to the interior of the car whereby the jacket-water of said engine is cooled and the interior of said car is heated.

4. In a heating system, the combination with a car of a tubular pilot therefor adapted to prevent obstructions from passing thereunder, means adapted to propel the car and adapted to heat said tubular pilot, means for conducting air contacting with said tubular pilot to the interior of the car and means for conducting relatively cold air from the exterior of the car to said last-mentioned means.

5. In a heating system, the combination with a car of an internal-explosion engine provided with a jacket adapted to propel said car, a pilot connected with the jacket of said engine and adapted to prevent obstructions from passing thereunder and adapted to be heated by water flowing therefrom, means adapted to conduct air from said pilot to the interior of the car and means adapted to conduct relatively cold air into said last-mentioned means.

6. In a heating system, the combination with a car of a tubular pilot adapted to prevent obstructions from passing thereunder, means upon said car adapted to heat said tubular pilot, means adapted to conduct air from the exterior of the car in contact with said tubular pilot and thence into said car in heated condition and means adapted to conduct relatively cold air into said last-mentioned conducting means.

7. In a heating system, the combination with a car of a tubular pilot adapted to prevent obstructions from passing thereunder, means upon said car adapted to heat said pilot, means adapted to conduct air from the exterior of the car in contact with said pilot and thence into said car in heated condition, means adapted to conduct relatively cold air into said last-mentioned conducting means and means adapted to vary the discharge through each of said conducting means.

8. In a heating system, the combination with a car of a pair of heating means mounted thereon, means upon said car adapted to maintain said heating means in operative condition, means adapted to concentrate air passing one of said heating means and direct said concentrated current of air against the other of said heating means and means adapted to conduct the heated air from said last-mentioned heating means to the interior of the car.

9. In a heating system, the combination with a car of a tubular pilot adapted to prevent obstructions from passing thereunder, a coil in the rear of said tubular pilot, heating means upon said car adapted to heat said coil and said tubular pilot, guiding means adapted to concentrate currents of air passing said tubular pilot and direct the same against said coil and means adapted to conduct air from said coil to the interior of the car.

10. In a heating system, the combination with a car of a tubular pilot adapted to prevent obstructions from passing thereunder, a coil in the rear of said tubular pilot, an internal-explosion engine provided with a jacket adapted to propel said car, means adapted to conduct water from the jacket of said engine through said coil and said tubular pilot, guiding means adapted to concentrate currents of air passing said tubular pilot and direct the same against said coil and means adapted to conduct air from said coil to the interior of said car.

11. In a heating and ventilating system, the combination with a car and an internal-explosion engine provided with a jacket mounted thereon and adapted to propel the same of a pilot arranged outside of said car and connected with the jacket said engine adapted to prevent obstructions from passing thereunder and adapted to transmit water flowing therefrom and means for directing air contacting with said pilot at will either into or outside of the car.

12. In a heating and ventilating system, the combination with a car and an internal-explosion engine provided with a jacket mounted thereon and adapted to propel the same, of a pilot arranged outside of said car and connected with the jacket of said engine adapted to prevent obstructions from passing thereunder and adapted to transmit water flowing therefrom, and means for directing air contacting with said pilot at will either into or outside of the car.

13. In combination, a car, an internal explosion-engine provided with a jacket mounted thereon and adapted to propel the same, a tubular pilot mounted upon said car and adapted to prevent obstructions from passing beneath the same, means adapted to lead water from the jacket of said engine through said tubular pilot for cooling said water and means adapted to discharge air heated by said pilot into or adjacent said car.

14. In a heating system, in combination, a car, an internal-explosion engine provided with a jacket mounted thereon and adapted to propel the same, a tubular pilot upon said car, a coil mounted in the rear of said tubular pilot, said pilot being adapted to prevent obstructions from passing under said car, converging baffle-plates mounted adjacent said pilot adapted to direct air against said coil, connections between the jacket of said engine and said coil and pilot, and means adapted to conduct air from said coil into the interior of said car.

15. In a heating system, in combination, a car, an internal-explosion engine provided with a jacket mounted thereon and adapted to propel the same, a tubular pilot upon said car, a coil mounted in the rear of said tubular pilot, said pilot being adapted to prevent obstructions from passing under said car, converging baffle-plates mounted adjacent said pilot and adapted to direct air against said coil, connections between the jacket of said engine and said coil and pilot, and means adapted to conduct air from said coil at will either into or outside of said car.

16. In a heating system, in combination, a car, an internal-explosion engine provided with a jacket mounted thereon and adapted to propel the same, a tubular pilot upon said car, a coil mounted in the rear of said tubular pilot, said pilot being adapted to prevent obstructions from passing under said car, converging baffle-plates mounted adjacent said pilot adapted to direct air against said coil, connections between the jacket of said engine and said coil and pilot, means adapted to conduct air from said coil at will either into or outside of said car and means adapted to conduct relatively cold air from the exterior of said car into said first-mentioned conducting means.

17. In combination, a car, an internal-explosion engine mounted thereon and adapted to propel the same, a jacket about the cylinder of said engine, a tubular pilot mounted upon the forward end of said car and adapted to prevent obstructions from passing beneath the same, connections between said jacket and said tubular pilot whereby said pilot is adapted to transmit water from said jacket and cool the same said pilot being exposed to the air and moving relatively thereto and means adapted to discharge rearwardly the air passing in contact with said pilot and heated thereby.

In testimony whereof I affix my signature in presence of two witnesses.

WILLIAM R. McKEEN, JR.

Witnesses:
 EDGAR M. KITCHIN,
 CHARLES L. DUNDEY.